June 26, 1956  C. O. LASSY  2,751,613
WEIGHT BALANCING DEVICE FOR TAPPING SPINDLE
Filed Oct. 19, 1953
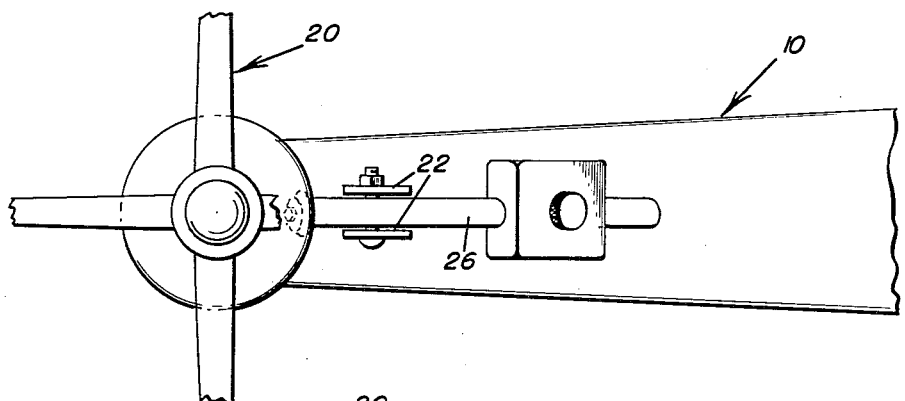
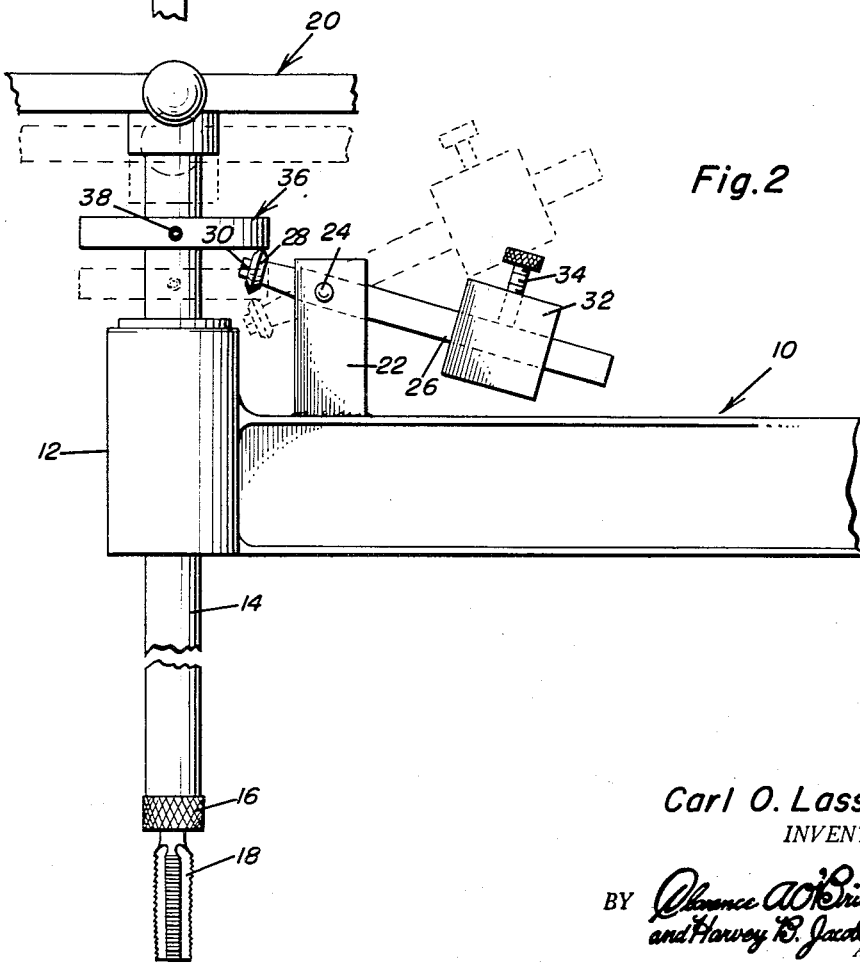
Carl O. Lassy
INVENTOR.

United States Patent Office 2,751,613
Patented June 26, 1956

2,751,613
WEIGHT BALANCING DEVICE FOR TAPPING SPINDLE

Carl O. Lassy, Plainville, Conn.

Application October 19, 1953, Serial No. 386,826

1 Claim. (Cl. 10—129)

This invention relates generally to attachment for hand tappers and pertains more particularly to a device for offsetting the weight of the spindle assembly of hand tappers and also to compensate for the downward force exerted by an operator's hand when manipulating the tapper.

A primary object of this invention is to provide a weight balancing device of the character described which is inexpensive and which may be readily adapted to many forms and types of hand tappers now in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view showing a portion of a hand tapper with the weight balancing device attached thereto; and Figure 2 is a side elevational view of the assembly shown in Figure 1.

Referring now more particularly to the drawings, reference numeral 10 generally indicates the horizontal support arm portion of the hand tapper frame which terminates at its outer or free end in an enlarged boss portion 12 within which is provided suitable bearing material for rotatably and slidably receiving the tool spindle 14. The lower end of the spindle is provided with a suitable collet or chuck mechanism 16 for removably receiving various sizes of taps 18 therein and the upper end of the spindle is provided with a hand-crank assembly indicated generally by the reference character 20.

Adjacent the boss 12 and on the horizontal frame portion 10 are provided a pair of spaced vertical bracket ears 22 which carry a pivot bolt 24 therebetween by means of which the balance rod 26 is pivotally secured to the machine about the horizontal transverse axis. The outer end of the balance rod is of reduced diameter and has provided thereon a contact wheel 28 which may be secured in longitudinal relation therewith as by fastening nuts 30, it being understood that the contact wheel is freely journaled on this end portion of the balance rod. The opposite end of the balance rod adjustably receives a weight element 32 which has a suitable bore therethrough for receiving this end portion of the balance rod and which also carries a set screw member 34 by means of which the weight element may be adjustably secured at various longitudinal positions along the balance rod. In conventional tapping machines wherein a gauge ring of conventional design is provided for determining the depth of the tapping action, the bracket ears and balance rod may be associated therewith such that the contact wheel 28 engages the under surface of this gauge ring but in those instances wherein the tapper is not provided with such a gauge ring, an annular collar indicated generally by the reference character 36 may be provided adjacent the upper end of the spindle and secured rigidly thereto as by a set screw member 38. Thus, it will be manifest that the contact wheel 28 will engage the peripheral undersurface of the collar 36 or the gauge ring whichever may be the case and the weight element 32 adjustably positioned on the balance rod 26 in such a manner as to offset both the weight of the spindle and associated mechanism as well as the force imparted downwardly by the operator as he manipulates the hand crank in rotating the tap 18. Thus, the broaching action which commonly occurs with machines of this type when extremely small taps are utilized is obviated, that is, the tap is allowed to follow its own lead rather than broaching through the work due to the weight of the spindle and the force imparted thereto by the operator's hand.

It will be appreciated that the above described weight balancing assembly may be readily adapted to various types of hand tappers now on the market and in use without substantial modification thereto other than the securement of the bracket ears which may be effected as by welding or the like, it being appreciated that the balancing device is extremely useful particularly in regards tapping of extremely small holes and through material which is of thin cross section.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In a hand tapping machine having a horizontally disposed frame portion provided at its free end with a boss and having an elongated spindle slidably and rotatably received in said boss, the spindle removably carrying a tap at its lower end and being provided with manually operable means for imparting rotation thereto at its upper end, a weight balancing device for preventing a broaching action by said tap comprising, an annular collar concentrically secured on said spindle between said boss and said manually operable means, bracket ears secured to said frame portion, an elongated bar pivotally carried by said ears and having one end portion underlying said collar, a contact wheel rotatably journalled on said one end portion of the bar, said wheel freely engaging the under surface of said collar, and a weight element adjustably slidably carried adjacent the opposite end portion of said bar whereby the weight of said spindle is counterbalanced by said weight.

References Cited in the file of this patent

UNITED STATES PATENTS 832,221     Tuttle _____ Oct. 2, 1906

FOREIGN PATENTS 290,548     Great Britain _____ May 17, 1928